United States Patent Office 3,031,035
Patented Apr. 24, 1962

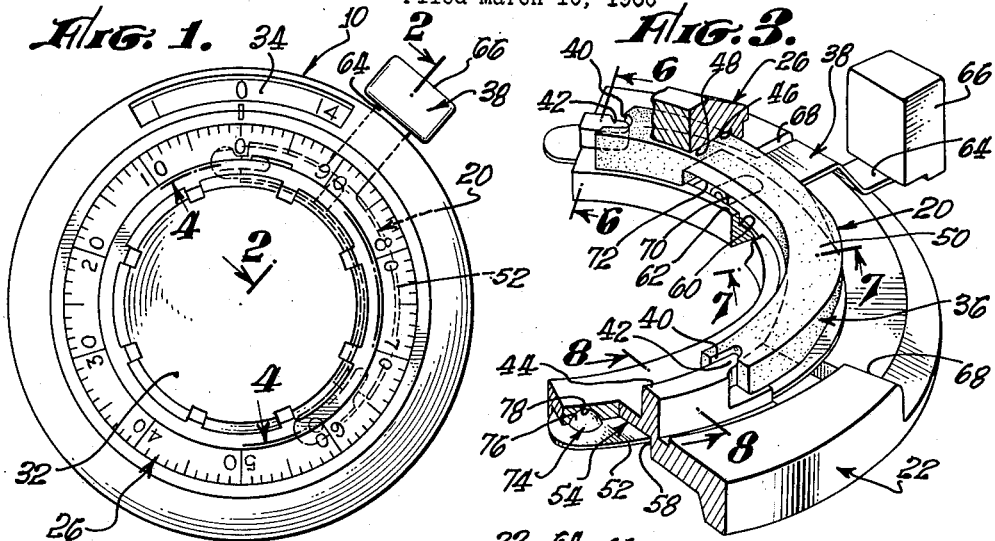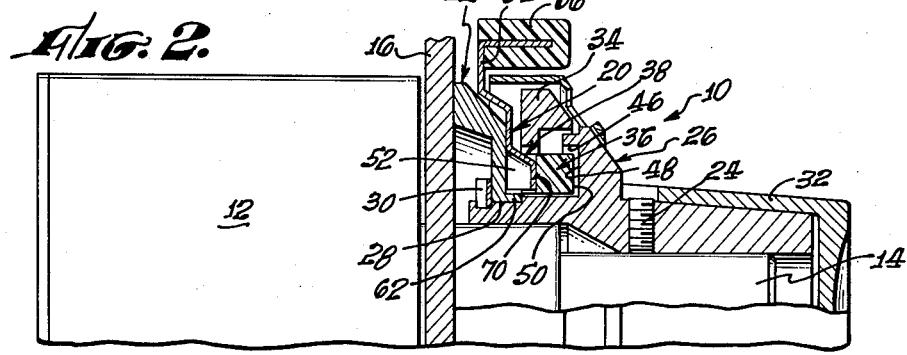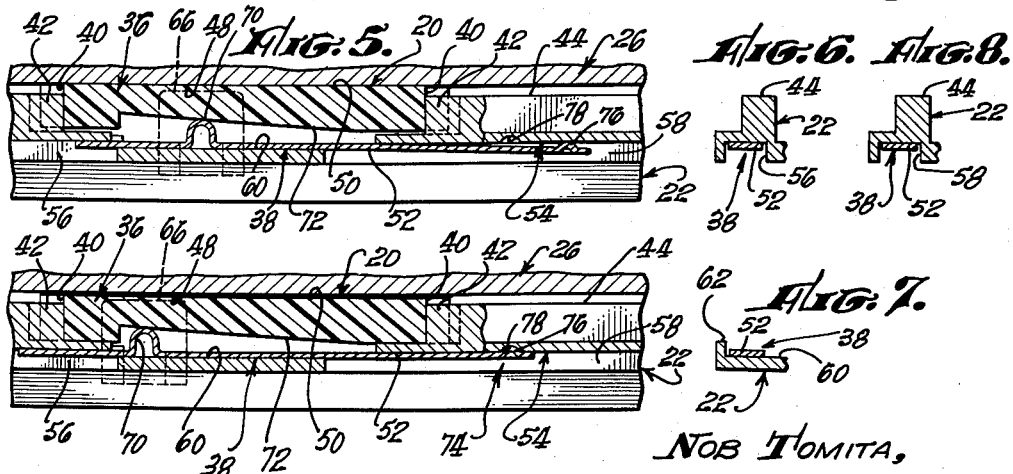

3,031,035
ANGULAR POSITION LOCKING DEVICE
Nob Tomita, Costa Mesa, Calif., assignor to Beckman Instruments, Inc., a corporation of California
Filed Mar. 10, 1960, Ser. No. 14,123
4 Claims. (Cl. 188—71)

The present invention relates in general to locking devices for releasably retaining rotors in desired angular positions and, more particularly, to a device for releasably locking in different angular positions a rotor of an angular position controlling apparatus, which may also be an indicating apparatus, to prevent movement of a component controlled by the apparatus under the influence of acceleration, vibration, and the like. Such an angular position controlling and/or indicating apparatus may, for example, be utilized to control and/or indicate the angular position of a component of a variable resistor, inductor, capacitor, or the like.

A primary object of the invention is to provide an angular position locking device which applies an axial force, as opposed to a radial force, to the rotor which it locks.

With locking devices which produce radial locking forces, undesirable radial motion is sometimes transmitted to the component whose angular position is to be controlled and/or indicated. The present invention, by providing an axial locking force, eliminates this difficulty.

Considering the invention more specifically, it contemplates a locking device for use with an angular position controlling and/or indicating apparatus which includes a base and a rotor rotatable relative to the base about a rotor axis, an important object of the invention being to provide a locking device for use in such an environment which includes an arcuate brake shoe carried by the base and extending circumferentially thereof about the rotor axis and movable axially of the base into frictional engagement with the rotor to lock the rotor in any desired angular position relative to the base, and which includes cam means carried by the base and movable circumferentially thereof about the rotor axis from an inoperative position to an operative position to move the brake shoe axially of the base into frictional locking engagement with the rotor.

Another object of the invention is to provide a construction of the foregoing nature wherein the rotor axis is normally at least generally horizontal and wherein the cam means is movable downwardly from its inoperative position to its operative position, whereby the action of gravity tends to maintain the cam means in its operative position to maintain the brake shoe in frictional engagement with the rotor, particularly under the influence of vibration.

An important object of the invention is to provide detent means on the cam means and the base for releasably locking the cam means in its inoperative position to prevent locking of the rotor by the brake shoe when it is desired to rotate the rotor. With this construction, acceleration, vibration, and the like cannot displace the cam means into its operative position when rotation of the rotor is desired, this being particularly advantageous when the rotor axis is at least generally horizontal and the cam means is movable downwardly into its operative position, as hereinbefore described.

Another object is to provide a locking device wherein the cam means includes an arcuate cam member extending circumferentially of the base about the rotor axis and registering with the brake shoe, and wherein the base is provided thereon with arcuate track means extending circumferentially about the rotor axis and along which the cam member is movable.

A further object is to provide a locking device wherein the cam member carries a generally radially outwardly extending lever and wherein the base is provided with circumferentially spaced stops engageable by the lever to limit circumferential movement of the cam member.

Still another object is to provide a locking device wherein the brake shoe is rendered axially movable, but is prevented from moving radially to any significant extent, by providing the ends thereof with notches which receive lugs on the base.

The foregoing objects, advantages, features and results of the present invention, together with various other objects, advantages, features and results thereof which will be evident to those skilled in the art in the light of this disclosure, may be achieved with the exemplary embodiment of the invention described in detail hereinafter and illustrated in the accompanying drawing, in which:

FIG. 1 is a front end elevational view of an angular position controlling and indicating apparatus which incorporates the locking device of the invention;

FIG. 2 is a fragmentary longitudinal sectional view taken along the arrowed line 2—2 of FIG. 1;

FIG. 3 is an enlarged, fragmentary, perspective view illustrating the locking device of the invention;

FIG. 4 is a developed sectional view which is taken along the arcuate arrowed line 4—4 of FIG. 1 and which illustrates a cam means of the locking device in its inoperative position;

FIG. 5 is identical to FIG. 4, except that it shows the cam means in its operative position; and FIGS. 6, 7, and 8 are fragmentary sectional views respectively taken along the arrowed lines 6—6, 7—7, and 8—8 of FIG. 3 of the drawing.

Referring to the drawing, the numeral 10 designates generally an apparatus for controlling and indicating the angular position of a helically movable contact, not shown, of a helically wound variable resistor 12 through a shaft 14, although it will be understood that the apparatus 10 may be utilized to control and indicate the position of movable components of other devices. In the drawing, the apparatus 10 and the resistor 12 are shown as mounted on a panel 16 with the panel therebetween and with the shaft 14 extending through the panel.

The angular position controlling and indicating apparatus 10, the resistor 12, and the manner in which these components are mounted on the panel 16, are disclosed in detail in United States Patent No. 2,746,417, granted May 22, 1956 to Howard B. McCord and Herbert E. McAlister. Consequently, a detailed description thereof is unnecessary and only those components of the angular position controlling and indicating apparatus 10 which cooperate with the locking device of the invention will be specifically identified, the locking device being designated generally by the numeral 20.

Considering the apparatus 10 briefly, it includes a base 22 which is shown as seated against the front side of the panel 16 and through which the shaft 14 projects forwardly, the base 22 being suitably secured to the panel in a manner not specifically shown. Telescoped over the forward end of the shaft 14 and secured thereto by a set screw 24 is a rotor 26 which, as more fully described in the aforementioned patent, serves to indicate any part of a revolution through which the shaft 14 has been rotated.

The rotor 26 is journalled in a bearing 28 on the base 22 and forward axial movement of the rotor 26 relative to the base is limited by a retaining washer 30. The rotor 26 is adapted to be rotated, to rotate the shaft 14, by a knob 32 telescoped over the forward end thereof.

The angular position controlling and indicating apparatus 10 also includes a second rotor 34 which indicates the number of complete revolutions through which the rotor 26 has been rotated, the rotor 34 being angularly displaced one increment per revolution of the rotor 26 in the manner disclosed in the aforementioned patent.

The function of the locking device 20 of the invention is to lock the rotor 26 in desired angular position, thereby locking the helically movable contact of the resistor 12 in a corresponding angular position despite acceleration, vibration, and the like. The locking device 20, of course, releases the rotor 26 whenever rotation thereof to change the angular position of the movable contact is desired.

Considering the locking device 20 generally, it includes an arcuate brake shoe 36 carried by the base 22 and extending circumferentially thereof about the axis of rotation of the rotor 26, and includes cam means 38 carried by the base and movable circumferentially thereof about the rotor axis for moving the brake shoe axially of the base into frictional engagement with the rotor 26 to lock such rotor in any desired angular position relative to the base. As hereinbefore explained, utilizing an axial braking force to lock the rotor 26 in any desired angular position imposes no radial force on the helically movable contact of the resistor 12 to tend to change the angular position of such contact, which is an important feature.

The brake shoe 36, which may be formed of any material suitable for the purpose, is provided at its ends with circumferentially and axially extending notches 40 which receive therein circumferentially and axially extending lugs 42 on the base 22, such lugs being shown as formed by the ends of an interrupted annular axially extending rib 44 on the base. With this construction, the brake shoe 36 is free to move in the axial direction, i.e., in the direction of the axis of the rotor 26, but is restrained against any significant radial movement.

The brake shoe 36 is prevented from moving axially to an extent sufficient to disengage the lugs 42 by the rotor 26. More particularly, as best shown in FIG. 2 of the drawing, the brake shoe 36 projects axially forwardly into a circumferentially extending groove 46 in the rotor 26 for this purpose. The groove 46 includes a transverse wall 48 which acts as a braking surface frictionally engageable by a braking surface 50 on the brake shoe 36 to lock the rotor 26 in the desired angular position.

The cam means 38 includes an arcuate cam member 52 extending circumferentially of the base 22 about the rotor axis and in radial register with the brake shoe 36. The cam member 52 is guided for circumferential movement relative to the base 22 about the rotor axis by a circumferentially extending, arcuate track means 54 on the base. As best shown in FIGS. 6 and 8, the track means 54 is formed in part by arcuate, circumferentially extending, circumferentially spaced grooves 56 and 58 in the rear side of the base 22. The sides of the grooves 56 and 58 serve to restrain the cam member 52 against radial movement and against forward axial movement. As shown in FIG. 7, the track means 54 also includes, intermediate the grooves 56 and 58, an arcuate, circumferentially extending, forwardly facing surface 60 which the cam member 52 engages and which prevents axially rearward movement of the cam member. Circumferentially coextensive with the surface 60 is an arcuate, circumferentially extending, forwardly directed flange 62 which assists the sides of the grooves 56 and 58 in restraining the cam member 52 against radially inward movement.

The cam member 52 is adapted to be moved circumferentially along the track means 54 and about the axis of the rotor 26 by a radially outwardly extending lever 64 which is integrally connected at its inner end to the cam member and which is provided at its outer end with a knob 66. Angular or circumferential movement of the cam member 52 is limited by circumferentially spaced stops 68 on the base 22 and engageable by the lever 64.

The cam member 52, which is preferably metallic and resilient, is transversely dimpled intermediate its ends to provide a radially extending, forwardly facing cam 70 which is engageable with and slidable circumferentially along a circumferentially inclined cam surface 72 on the brake shoe 36 on the opposite side of the brake shoe from the braking surface 50 thereon. As will be apparent, when the cam member 52 is in the position shown in FIGS. 1 to 4, which is its inoperative position, the cam 70 engages the cam surface 72 adjacent the "low" end thereof, the cam surface 72 being regarded as increasing in height rearwardly and in the clockwise direction, as viewed in FIGS. 1 and 3 of the drawing. When the cam member 52 is in its inoperative position, the braking surface 50 on the brake shoe 36 is out of frictional locking engagement with the braking surface 48 on the rotor 26. Consequently, the rotor 26 may be rotated freely. It will be noted that the lever 64 is engageable with one of the stops 68 to prevent movement of the cam member 52 beyond its inoperative position.

In order to lock the rotor 26 against rotation, it is merely necessary to displace the lever 64 in the clockwise direction. The result of this is to displace the cam 70 circumferentially toward the "high" end of the cam surface 72 so that the cam displaces the brake shoe 36 axially to cause the braking surface 50 thereon to enter into frictional locking engagement with the braking surface 48 on the rotor 26 to lock the rotor against rotation. This condition is shown in FIG. 5 of the drawing, the position of the cam member 52 shown in this figure being regarded as the operative position thereof. As will be apparent, the magnitude of the axial braking force depends on the extent of angular movement of the cam member 52 in the clockwise direction from its inoperative position.

It will be noted that with the apparatus 10 mounted with its axis generally horizontal as shown, and with the locking device 20 located on the right-hand side thereof as shown, the clockwise movement of the cam member 52 necessary to frictionally lock the rotor 26 is essentially downward movement. Consequently, gravity tends to maintain the frictional locking action, particularly under the influence of vibration, which is desirable.

In order to prevent acceleration, vibration, or the like from setting the locking device 20, and in order to prevent accidental setting thereof, when it is desired to rotate the rotor 26, the invention provides detent means 74 on the cam means 38 and the base 22 for releasably locking the cam member 52 in its hereinbefore described inoperative position. As shown, the detent means 74 includes a detent 76 adjacent one end of the cam member 52 and receivable in a recess 78 in the base 22 when the cam member is in its inoperative position, the detent 76 being formed by dimpling the cam member. The inherent resilience of the cam member 52 tends to maintain the detent 76 in the recess 78 so that it is necessary to apply a significant force to the lever 64 to move the cam member 52 out of its inoperative position and toward its operative one. As will be clear from FIG. 5 of the drawing, the cam member 52 flexes rearwardly in the vicinity of the detent 76 in order to permit such detent to leave the recess 78.

Releasably locking the cam member 52 in its inoperative position in the foregoing manner provides a positive "feel" for such inoperative position and also prevents movement of the cam member into its operative position accidentally, or under the influence of acceleration, vibration, or the like. Thus, the locking device 20 cannot accidentally interfere with rotation of the rotor 26 when such rotation is desired. On the other hand, the locking device 20 positively prevents rotation of the rotor 26 when it is desired to preserve a predetermined setting for the helically movable contact, or other element, controlled by the shaft 14.

It is thought that the over-all operation of the locking device 20 will be clear from the foregoing and that a separate explanation of its operation is therefore unnecessary.

Although an exemplary embodiment of the invention has been disclosed for purposes of illustration, it will be understood that various changes, modifications, and substitutions may be incorporated in such embodiment without departing from the spirit of the invention as defined by the claims which follow.

I claim:

1. In combination: a base providing a generally horizontal rotor axis; a rotor rotatable relative to said base about said rotor axis; an arcuate brake shoe carried by said base and extending circumferentially thereof about said rotor axis and movable axially of said base into frictional engagement with said rotor to lock said rotor in any desired angular position relative to said base; cam means carried by said base and movable circumferentially thereof about said rotor axis along an arcuate path from an inoperative position to an operative position for moving said brake shoe axially of said base into frictional engagement with said rotor, said operative position of said cam means being below said inoperative position thereof, whereby said cam means is movable downwardly along said arcuate path from its inoperative position to its operative position so that gravity constantly biases said cam means toward and tends to maintain it in said operative position and resists movement thereof toward said inoperative position, gravity providing the sole force constantly biasing said cam means along said arcuate path in either direction; and detent means on said cam means and said base for releasably locking said cam means in said inoperative position.

2. In combination: a base providing a rotor axis; a rotor rotatable relative to said base about said rotor axis; an arcuate brake shoe carried by said base and extending circumferentially thereof about said rotor axis and movable axially of said base into frictional engagement with said rotor to lock said rotor in any desired angular position relative to said base; cam means carried by said base and movable circumferentially thereof about said rotor axis from an inoperative position to an operative position for moving said brake shoe axially of said base into frictional engagement with said rotor, said cam means including an arcuate cam member having circumferentially spaced ends and extending circumferentially of said base about said rotor axis and registering with said brake shoe, said base having therein an arcuate track groove extending circumferentially thereof about said rotor axis and along which said cam member is movable; and detent means on said cam means and said base for releasably locking said cam means in said inoperative position.

3. In combination: a base providing a rotor axis; a rotor rotatable relative to said base about said rotor axis; an arcuate brake shoe carried by said base and extending circumferentially thereof about said rotor axis and movable axially of said base into frictional engagement with said rotor to lock said rotor in any desired angular position relative to said base, said brake shoe having a cam surface thereon; cam means carried by said base and movable circumferentially thereof about said rotor axis from an inoperative position to an operative position for moving said brake shoe axially of said base into frictional engagement with said rotor, said cam means including an arcuate cam member having circumferentially spaced ends and extending circumferentially of said base about said rotor axis and registering with said brake shoe, said base having therein an arcuate track groove extending circumferentially thereof about said rotor axis and along which said cam member is movable, said cam member having adjacent one end thereof a cam engageable with said cam surface on said brake shoe; and detent means on said cam means and said base for releasably locking said cam means in said inoperative position, said detent means including a detent on said cam member adjacent the other end thereof.

4. In combination: a base providing a rotor axis; a rotor rotatable relative to said base about said rotor axis; an arcuate brake shoe carried by said base and having circumferentially spaced ends and extending circumferentially of said base about said rotor axis and movable axially of said base into frictional engagement with said rotor to lock said rotor in any desired angular position relative to said base, the ends of said brake shoe being provided with notches therein and said base being provided thereon with lugs respectively disposed in said notches to retain said brake shoe on said base in the radial direction; cam means carried by said base and movable circumferentially thereof about said rotor axis from an inoperative position to an operative position and registering with said brake shoe for moving said brake shoe axially of said base into frictional engagement with said rotor; and detent means on said cam means and said base for releasably locking said cam means in said inoperative position.

References Cited in the file of this patent

UNITED STATES PATENTS

| | | |
|---|---|---|
| 1,332,487 | Dale | Mar. 2, 1920 |
| 1,613,541 | Smith | Jan. 4, 1927 |
| 2,072,877 | Green | Mar. 9, 1937 |